United States Patent [19]
Nakagawa et al.

[11] Patent Number: 4,668,883
[45] Date of Patent: May 26, 1987

[54] LINEAR PULSE MOTOR

[75] Inventors: Hiroshi Nakagawa; Hiroshi Iwamoto; Hiroshi Kanada; Kazumichi Kato; Yutaka Kurita, all of Mie, Japan

[73] Assignee: Shinko Electric Co., Ltd., Tokyo, Japan

[21] Appl. No.: 760,398

[22] Filed: Jul. 30, 1985

[51] Int. Cl.$^4$ .................................... H02K 41/00
[52] U.S. Cl. ........................................ 310/12
[58] Field of Search ........................ 310/12–14; 318/135

[56] References Cited
U.S. PATENT DOCUMENTS
4,545,117 10/1985 Okamoto .................... 310/12 X Primary Examiner—Donovan F. Duggan
Attorney, Agent, or Firm—James P. Ryther

[57] ABSTRACT

In a linear pulse motor which includes: a movable body having an iron core provided with a coil or coils and side plates for supporting the iron core; a stationary body having magnetic circuit forming means for forming a magnetic circuit with the iron core across an air gap between the iron core and the magnetic circuit forming means; an axle fixed to the movable body, and wheels supported rotatably on end portions of the axle, respectively, and rollable on and along the stationary body; wherein the coil or coils are energized by pulses of a predetermined drive frequency to impart a stepwise magnetic drive force to the movable body, the length of the axle between the wheels is so determined that a noise level peak frequency or resonant frequency of the movable body is sufficiently far from the predetermined drive frequency.

8 Claims, 7 Drawing Figures

Prior Art FIG.1
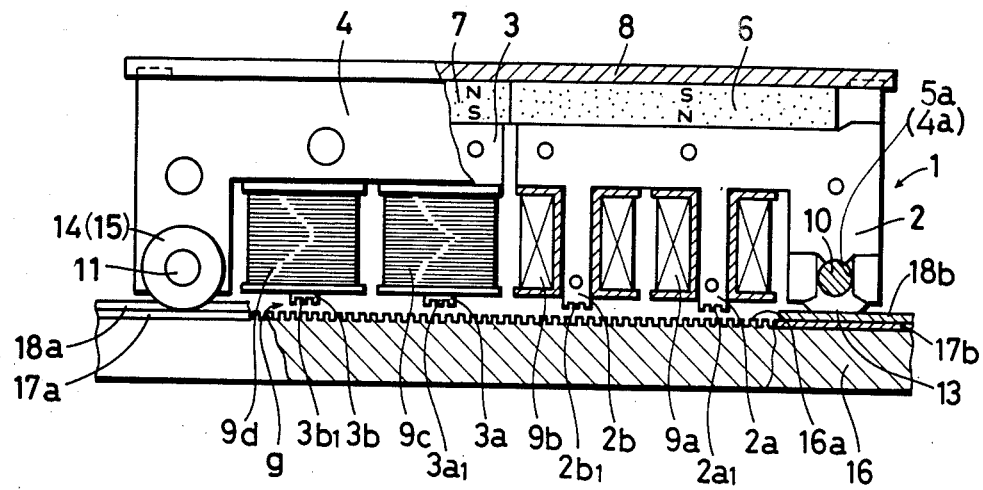
Prior Art FIG.2
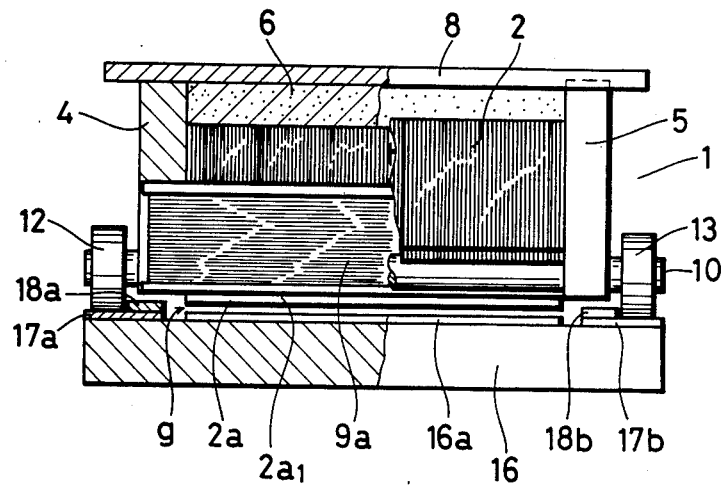

1

LINEAR PULSE MOTOR

BACKGROUND OF THE INVENTION

1. Field of the Invention

This invention relates to a linear pulse motor, and more particularly to a linear pulse motor which can reduce noise level.

2. Description of Prior Art

A linear pulse motor is used, for example, for linearly moving and accurately positioning head in a printer or an optical read-out apparatus. Necessary displacement and propelling force for the head are relatively small. Nevertheless, the noise level from the linear pulse motor is considerable high.

SUMMARY OF THE INVENTION

Accordingly, it is an object of this invention to provide a linear pulse motor in which the noise level can be lower than that in the prior art linear pulse motor.

In accordance with an aspect of this invention, in a linear pulse motor which includes: (A) a movable body having an iron core provided with a coil or coils and side plates for supporting said iron core; (B) a stationary body having magnetic circuit forming means for forming a magnetic circuit with said iron core across an air gap between said iron core and said magnetic circuit forming means; (C) an axle fixed to said movable body; and (D) wheels supported rotatably on end portions of said axle, respectively, and rollable on and along said stationary body; wherein said coil or coils are energized by pulses of a predetermined drive frequency to impart a stepwise magnetic drive force to said movable body, the length of said axle between said wheels is so determined that a noise level peak frequency or resonant frequency of said movable body is sufficiently far from said predetermined drive frequency.

The foregoing and other objects, features, and advantages of the present invention will be more readily understood upon consideration of the following detailed description of the preferred embodiments of the invention, taken in conjunction with the accompanying drawing.

BRIEF DESCRIPTION OF THE DRAWINGS

FIG. 1 is a partly-broken side view of a prior art linear pulse motor;

FIG. 2 is a partly-broken front view of the prior art linear pulse motor;

DETAILED DESCRIPTION OF PREFERRED EMBODIMENTS

Figure 3:
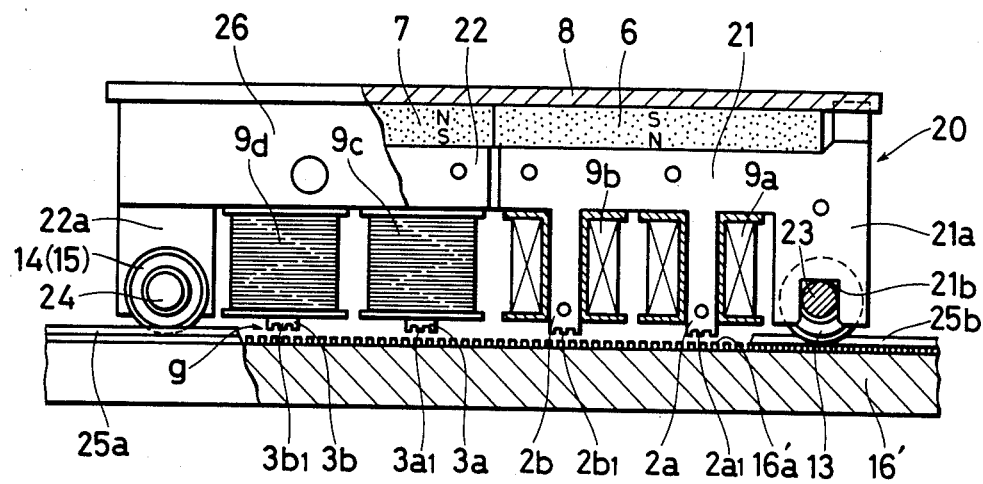
FIG. 3 is a partly-broken side view of a linear pulse motor according to a first embodiment of this invention.

First, for facilitating the understanding of this invention, a linear pulse motor of prior art will be described with reference to FIG. 1 and FIG. 2.

In a primary body 1, two iron cores 2 and 3 insulated magnetically from each other are fixed to non-magnetic side plates 4 and 5 at both sides. Permanent magnets 6 and 7 polarized oppositely to each other, as shown in FIG. 1, are attached to the upper surfaces of the iron cores 2 and 3, respectively. A magnetic plate 8 is mounted on the permanent magnets 6 and 7.

The iron cores 2 and 3 include downwardly extending magnetic poles 2a and 2b, and 3a and 3b, respectively. Coils 9a, 9b, 9c and 9d are fitted to the magnetic poles 2a, 2b, 3a and 3b, respectively. Axles 10 and 11 of non-magnetic material are pressedly fitted into grooves 4a and 5a of both lower end portions of the U-shaped side plates 4 and 5. Wheels 12 and 13, and 14 and 15 are rotatably supported on the end portions of the axles 10 and 11 projected from the side plates 4 and 5, respectively. Three teeth 2a1, 2b1, 3a1 and 3b1, are formed at regular pitches on the lower end surfaces of the magnetic poles 2a, 2b, 3a and 3b, respectively. The pitches of the teeth 2a1, 2b1, 3a1 and 3b1 are equal to each other. However, the teeth 2a1, 2b1, 3a1 and 3b1 of the magnetic poles 2a, 2b, 3a and 3b are shifted, in turn, from one another by length of ¼ pitch.

In a secondary body 16, teeth 16a are formed at regular pitches which are equal to the regular pitches of the teeth 2a1, 2b1, 3a1 and 3b1 of the primary body 1. The secondary body 16 is made of magnetic material. The wheels 12 to 15 ride on non-magnetic band plates 17a and 17b which are fixed on the side end portions of the secondary body 16, and they are guided by non-magnetic guide band plate 18a and 18b which are fixed to the band plates 17a and 17b along the latter. An air gap g is formed between the teeth 2a1, 2b1, 3a1 and 3b1 of the primary body 1, and the teeth 16a of the secondary body 16.

The secondary body 16 is fixed to, although not shown, a stationary body. The primary body 1 is movable.

For example, when the coils 9a to 9d are energized by one-phase energization method, they are, in turn, energized. It is now assumed that the teeth 3b1 of the magnetic-pole 3b face directly to the teeth 16a of the secondary body 16. Then, a constant DC current is supplied to the coil 9a for a predetermined time. Induced magnetic flux flows through the loop consisting of the magnetic pole 2a, the gap g, the secondary body 16, the gap g, the magnetic pole 2b and the yoke portion between the magnetic poles 2a and 2b. Magnetic flux from the permanent magnets 6 and 7 is added to the induced magnetic flux in the magnetic pole 2a, while it is cancelled with the induced magnetic flux in the magnetic pole 2b. Magnetic attraction occurs between the teeth 2a1 of the magnetic pole 2a and the teeth 16a of the secondary body 16. The primary body 1 moves forwards by ¼ pitch so that the teeth 2a1 of the magnetic pole 2a come to face directly to the teeth 16a of the secondary body 16, respectively. Next, the constant DC current is supplied to the coil 9b for the predetermined time. Induced magnetic flux flows through the loop consisting of the magnetic pole 2b, the gap g, the secondary body 16, the gap g, the magnetic pole 2a and the yoke portion between the magnetic poles 2a and 2b. Magnetic flux from the permanent magnets 6 and 7 is added to the induced magnetic flux in the magnetic pole 2b, while it is cancelled with the induced magnetic flux in the magnetic pole 2a. Magnetic attraction occurs between the teeth 2b1 of the magnetic pole 2b and the teeth 16a of the secondary body 16. The primary body 1 moves forwards by ¼ pitch so that the teeth 2b1 of the magnetic pole 2b come to face directly to the teeth 16a of the secondary body 16, respectively.

Similarly, the coils 9c and 9d are, in turn, energized. Thus, the primary body 1 moves forwards step by step in ¼ pitch. Actually, it looks to move continuously forwards.

In the above described manner, the coils 9a to 9d are energized by pulses of a predetermined drive frequency to impart a step-wise magnetic drive force to the primary body 1. However, the primary body 1 makes considerable noise due to vibration.

Figure 4:
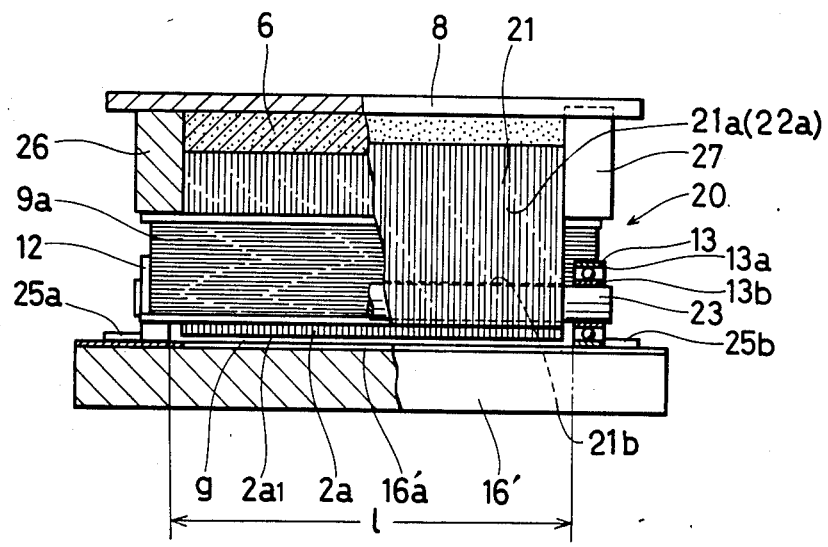
FIG. 4 is a partly-broken front view of the linear pulse motor of FIG. 3.

Next, a linear pulse motor according to one embodiment of this invention will be described with reference to FIG. 3 and FIG. 4. Parts in FIG. 3 and FIG. 4 which correspond to those in FIG. 1 and FIG. 2, are denoted by the same reference numerals, the description of which will be omitted.

Side plates 26 and 27 for supporting iron cores 21 and 22 are rectangular, not U-shaped. There is room for the wheels 13 to 16 directly under the side plates 26 and 27. The iron cores 21 and 22 includes downwardly extending arm portions 21a and 22a, respectively. Grooves 21b and 22b are formed in the lower surfaces of the arm portions 21a and 22a, respectively. The one groove 22b is not shown. Axles 23 and 24 of non-magnetic material are pressedly fitted into the grooves 21b and 22b. Thus, they are fixed to a primary body 20. Further, adhesive may be dottedly applied to the axles 23, 24 and the arm portions 21a and 22a.

The wheels 13 to 16 are ball bearings. The ends portions of the axles 23 and 24 are tightly fitted to inner races 13b to 16b of the ball bearings 13 to 16. Only the inner race 13b of the ball bearings 13 is representatively shown in FIG. 4.

A pair of guide band plates 25a and 25b are fixed to a secondary body 16'. Outer races 13a to 16a of the bearings 13 to 16 are guided by the guide band plates 25a and 25b. Only the outer races 13a of the ball bearing 13 is representatively shown. The ball bearing or wheels 13 to 16 are positioned directly under the side plates 26 and 27. Teeth 16a' are formed by slits of a magnetic sheet attached onto the secondary body 16'. Of course, they may be formed as ridge on the secondary body as in FIG. 1 and FIG. 2.

The width of the iron cores 21 and 22 is equal to that of the iron cores 2 and 3 of the prior art. Accordingly, the length l of the axles 23 and 24 between the wheels 13 to 16 is smaller than the length of the axles 10 and 11 between the wheels 13 to 16 of the prior art.

The coils 9a to 9b are energized by the pulses of the predetermined drive frequency in the same manner as the prior art. The primary body 20 moves along the guide band plates 25a and 25b by the stepwise magnetic drive force. The noise generated from the primary body 20 is further less than that from the primary body 1 of the prior art.

Generally, a natural or resonant frequency of longitudinal vibration of a bar is in inverse proportion to its length. Accordingly, the resonant frequency of the axles 23 and 24 or the primary body 20 is higher than that of the axles 10 and 11 or the primary body 1. The predetermined drive frequency of the coils 9a to 9d is lower than the resonant frequency of the primary body 1 of the prior art. Accordingly, the resonant frequency of the primary body 20 is further from the predetermined drive frequency than the resonant frequency of the primary body 1. Thus, the level of the noise due to vibration of the primary body 20 is further lower than the level of the noise due to vibration of the primary body 1 of the prior art 1.

Figure 5:
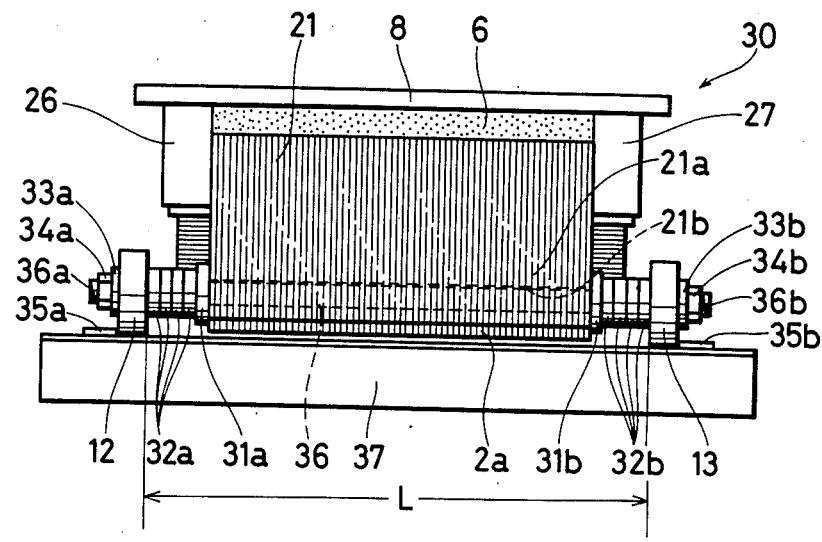
FIGS. 5 and 6 are front views of a linear pulse motor according to a second embodiment of this invention, in which spacer rings are removed in FIG. 6 from FIG. 5.
Figure 6:
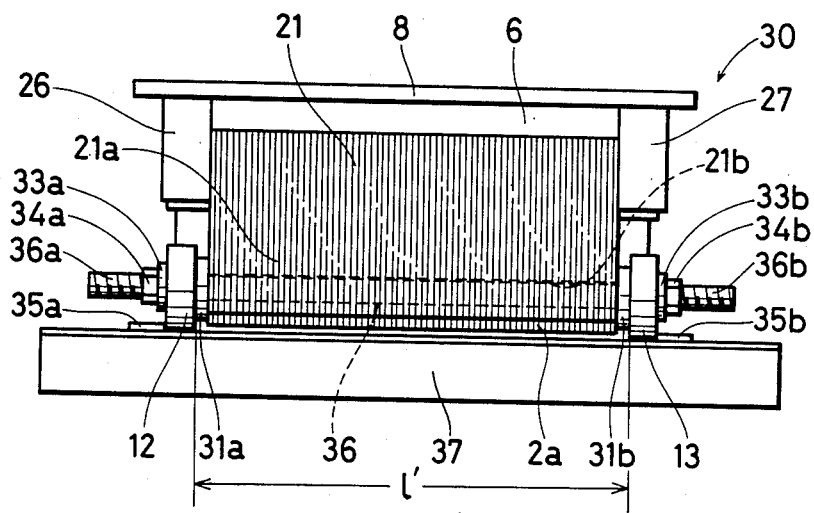

FIG. 5 and FIG. 6 show a linear pulse motor according to a second embodiment of this invention. Parts in FIG. 5 and FIG. 6 which correspond to those in FIG. 3 and FIG. 4, are denoted by the same reference numerals.

An axle 36 is pressedly fitted into the groove 21b of the downwardly extending arm portion 21a in the same manner as the axle 23 of the first embodiment. Threads 36a and 36b are formed in the end portions of the axle 35.

In FIG. 5, spacers 31a, 31b and four adjusting spacer rings 32a and 32b are slidably fitted to the end portions of the axle 36. Similarly, the wheels 12 and 13, and washers 33a and 33b are slidably fitted to the end portions of the axle 36. Nuts 34a and 34b are screwed to the threads 36a and 36b of the axle 36, and fastened for fixing the spacers 31a, 31b, four adjusting spacer rings 32a and 32b and wheels 12 and 13 to a primary body 30.

Another axle is not shown in FIG. 5 and FIG. 6. However, it is constructed as the axle 36. Spacers and four adjusting spacer rings are fitted to the end portions of the other axle.

Guide band plates 35a and 35b are so fixed on a secondary body 37 that the distance between the guide band plates 35a and 35b is adjustable. The outer races of the wheels 12 and 13 are guided by the guide band plates 35a and 35b along the longitudinal direction of the secondary body 37. Magnetic teeth are formed on the secondary body 37 in the same manner as those in the first embodiment.

In FIG. 6, the four spacer rings 32a and 32b are removed from the axle 36. Accordingly, the wheels 12 and 13 are positioned directly under the side plates 26 and 27. The effecture length l' of the axle 36 between the wheels 12 and 13 is nearly equal to the length l of the axle 23 between the wheels 12 and 13 of the first embodiment. Accordingly, the resonant frequency of the primary body 30 is nearly equal to that of the primary body 20 of the first embodiment.

In FIG. 5, since the adjust four spacer rings 32a, 32b are fitted to the axle 36, the effective length L of the axle 36 between the wheels 12 and 13 is larger by the thickness of the twice four spacer rings 32a and 32b than that of FIG. 6.

Figure 7:
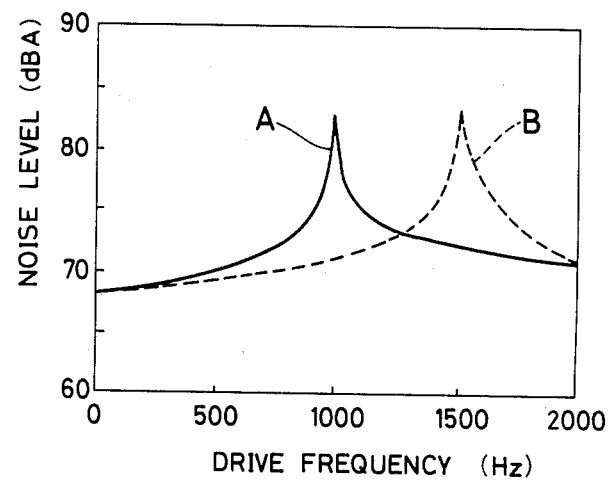
FIG. 7 is graphs showing the relationships between drive frequency and noise level for the cases of FIG. 5 and FIG. 6.

FIG. 7 shows the relationships between the noise level and the drive frequency for the cases of FIG. 5 and FIG. 6. A graph A is for the case of FIG. 5. A graph B is for the case of FIG. 6. As clear from FIG. 7, a resonant frequency of the case of FIG. 5 is about 1000 Hz. The noise level at the resonant frequency is higher than 80 dBA. A resonant frequency of the case of FIG. 6 is about 1500 Hz. The noise level at the resonant frequency is higher than 80 dBA. When the linear pulse motor of FIG. 5 is driven by the pulse of drive frequency 1500 kHz, the noise level is about 70 dBA. On the other hand, when the linear pulse motor of FIG. 6 is driven by the pulses of drive frequency 1000 Hz, the noise level is about 70 dBA. Thus, the noise level is decreased by 10 dBA in the cases of FIG. 5 and FIG. 6.

The number of the spacer rings 32a and 32b may be so changed that the resonant frequency or noise level peak frequency of the primary body 30 is sufficiently far from the predetermined drive frequency.

While the preferred embodiments have been described, variations thereto will occur to those skilled in the art within the scope of the present inventive concepts which are delineated by the following claims.

For example, this invention may be applied to a linear pulse motor which is different in construction from the shown linear pulse motor.

In the second embodiment, the four adjust spacer rings 32a and 32b are used for the respecture end portions 36a and 36b of the axle 36. The number of the adjust spacer rings 32a and 32b is not limited to four, but it may be more or less.

Further, the side plates 4 and 5 of the prior art is U-shaped, while the side plates 26 and 27 of the above embodiments is rectangular. The downwardly extending arm portions are omitted from the side plates 4 and 5 in the above embodiments. However, the side plates 4 and 5 may be applied to this invention.

Further in the above embodiments, the guide band plates 25a and 25b, 35a and 35b are outside of the wheels 12 to 15. However, they may be inside of the wheels 12 to 15 in the same manner as those in FIG. 1 and FIG. 2.

Further, in the above embodiments, it is assumed that the drive force is sinusoidal wave. However, if it is not sinusoidal wave, it is required that the noise level peak frequency or resonant frequency of said movable body is sufficiently far also from frequencies of harmonic waves of the drive force (drive pulses).

What is claimed is:

1. In a linear pulse motor which includes:
   (a) a movable body having an iron core provided with a plurality of coils and side plates for supporting said iron core;
   (b) a stationary body having magnetic circuit forming means for forming a magnetic circuit with said iron core across an air gap between said iron core and said magnetic circuit forming means;
   (c) an axle fixed to said movable body; and
   (d) wheels supported rotatably on end portions of said axle, respectively, and rollable on and along said stationary body; wherein said plurality of coils are energized by pulses of a predetermined drive frequency to impart a stepwise magnetic drive force to said movable body,
   the improvements in which said axle is fixed to said iron core, and said wheels are positioned directly under said side plates, whereby the length of said axle between said wheels is so reduced that a resonant frequency of said movable body is sufficiently far from said predetermined drive frequency and frequencies of harmonic waves of said pulses.

2. A linear pulse motor according to claim 1, in which a groove is formed in the under surface of said iron core, and said axle is pressedly fitted into said groove.

3. A linear pulse motor according to claim 2, in which said groove is formed in the under surface of each end portions of said iron core with respect to the moving direction of said movable body.

4. In a linear pulse motor which includes:
   (a) a movable body having an iron core provided with a plurality of coils and side plates for supporting said iron core;
   (b) a stationary body having magnetic circuit forming means for forming a magnetic circuit with said iron core across an air gap between said iron core and said magnetic circuit forming means;
   (c) an axle fixed to said movable body; and
   (d) wheels supported rotatably on end portions of said axle, respectively, and rollable on and along said stationary body; wherein said plurality of coils are energized by pulses of a predetermined drive frequency to impart a stepwise magnetic drive force to said movable body, the improvements in which spacer rings are sandwiched between each of the respective wheels and the side surface of said iron core, whereby the length of said axle between said wheels is determined by the number of said spacer rings used, whereby the resonant frequency of said movable body is sufficiently far from said predetermined drive frequency and frequencies of harmonic waves of said pulses.

5. A linear pulse motor according to claim 4, in which the number of said spacer rings is changed in accordance with said predetermined drive frequency.

6. A linear pulse motor according to claim 5, in which said axle is fixed to said iron core, and said wheels are positioned directly under said side plate, when there are none of said spacer rings sandwiched between each of the respective wheels and the side surface of said iron core.

7. A linear pulse motor according to claim 6, in which a groove is formed in the under surface of said iron core, and said axle is pressedly fitted into said groove.

8. A claim pulse motor according to claim 7, in which said groove is formed in the under surface of each end portions of said iron core with respect to the moving direction of said movable body.

* * * * *